United States Patent [19]
Muzzy et al.

[11] Patent Number: 5,171,630
[45] Date of Patent: Dec. 15, 1992

[54] FLEXIBLE MULTIPLY TOWPREG

[75] Inventors: John D. Muzzy, Atlanta; Babu Varughese, Grovetown, both of Ga.

[73] Assignee: Georgia Tech Research Corporation, Atlanta, Ga.

[21] Appl. No.: 700,559

[22] Filed: May 15, 1991

Related U.S. Application Data

[62] Division of Ser. No. 339,297, Apr. 17, 1989.

[51] Int. Cl.$^5$ .............................................. B32B 9/00
[52] U.S. Cl. .................................. 428/294; 428/303; 428/408; 428/902
[58] Field of Search ................. 428/294, 303, 408, 902

[56] References Cited
U.S. PATENT DOCUMENTS 4,714,642 12/1987 McAliley et al. .................... 428/299

Primary Examiner—James J. Bell
Attorney, Agent, or Firm—Hurt, Richardson, Garner, Todd & Cadenhead

[57] ABSTRACT

This invention relates to an improved flexible towpreg and a method of production therefor. The improved flexible towpreg comprises a plurality of towpreg plies which comprise reinforcing filaments and matrix forming material; the reinforcing filaments being substantially wetout by the matrix forming material such that the towpreg plies are substantially void-free composite articles, and the towpreg plies having an average thickness less than about 100 microns. The method of production for the improved flexible towpreg comprises the steps of spreading the reinforcing filaments to expose individually substantially all of the reinforcing filaments; coating the reinforcing filaments with the matrix forming material in a manner causing interfacial adhesion of the matrix forming material to the reinforcing filaments; forming the towpreg plies by heating the matrix forming material contacting the reinforcing filaments until the matrix forming material liquifies and coats the reinforcing filaments; and cooling the towpreg plies in a manner such that substantial cohesion between neighboring towpreg plies is prevented until the matrix forming material solidifies.

4 Claims, 7 Drawing Sheets

FLEXIBLE MULTIPLY TOWPREG

This invention was made with United States government support under Contract Number NAG-1-864 awarded by NASA. The United State government has certain rights in this invention.

This is a divisional of co-pending application Ser. No. 07/339,297 filed on Apr. 17, 1989.

BACKGROUND OF THE INVENTION

1. Field of the Invention

The present invention is directed to flexible multiply towpreg and a method of production therefor and, more specifically, a very flexible multiply towpreg suitable for weaving, braiding, and the like, and a method for producing such a towpreg.

2. Discussion of the Prior Art

Towpreg consists of two components, continuous fibers or filaments combined with a matrix resin. Conventional towpreg consists of hundreds or thousands of the fibers or filaments embedded in a continuous mass of the matrix. The advanced reinforcing fibers typically used are available commercially in continuous form in "bundles" of filaments known as "tows" which vary widely in number of filaments per tow. Many matrix resins are available, however two kinds of matrix resin systems dominate the prior art: thermoset and thermoplastic polymers.

Thermoplastic polymers have been widely used as matrices for composites, and are potentially useful as matrices for advanced composites for aerospace applications. Thermoplastics have advantages over thermosetting materials in fracture toughness, impact strength and environmental resistance. Thermoplastics also provide prepregs with indefinite shelf life, give the fabricator better quality assurance and avoids the storage and refrigeration problem associated with thermosetting prepreg. Thermoplastic molecules are tougher than the rigid cross-linked network of the thermosets; few of the toughened thermosets have met the combined requirements of damage tolerance and hot/wet compression strength necessary for use in aerospace composites.

The disadvantage of thermoplastic polymers as a composite matrix material is the difficulty of uniformly coating the fibers due to the high viscosity of the molten polymer. Also the poor wetting characteristics of carbon fibers, when used as the tow, leads to the formation of voids. Additionally, thermoplastic towpreg is rigid and is not well-suited for weaving or braiding as the resulting fabrics are stiff. Similarly, the rigidity of thermoplastic towpreg complicates the filament winding of complex shapes; heat must be focused at the point of contact to achieve towpreg conformability during layup.

Thermoset polymers also are used as matrices for towpreg. Towpreg containing thermosetting prepolymer, although relatively flexible, is tacky, thus requiring a protective release coating which must be removed prior to use. While thermoset towpreg is acceptable for filament winding, its tackiness and the requirement of a protective release coating make thermoset towpreg unfeasible for weaving, braiding, or the production of chopped fiber feed stock for bulk or sheet molding compounds.

Two other types of towpreg are: metal matrix towpreg, which is similar to thermoplastic towpreg, and partially cured ceramic towpreg which is similar to thermoset towpreg. However, due to the limited markets for metal and ceramic composites, these materials are not generally available and have not been the focus of developments in manufacturing technology. Metal and ceramic matrix towpregs can be manufactured in a manner and form analogous to thermoplastic and thermosetting towpregs.

Continuous fiber tow prepregs can be produced by a number of impregnation methods including hot melt, solution, emulsion, slurry, surface polymerization, fiber commingling, film interleaving, electroplating, and dry powder techniques.

In hot melt processing, impregnation may be accomplished by forcing the fiber and resin through a die at high temperature under conditions that create high shear rates. Due to the high temperatures of this process, the thermoplastic material can degrade. Other disadvantages of this process include the high stress applied to the tow and difficulties in impregnating the tow with thermoplastics.

In solution coating, the matrix material is dissolved in solvent and the fiber tow is passed through this solution and then dried to evaporate the solvent. Two disadvantages associated with this process is that thermoplastics usually exhibit limited solubility at high concentration, and most engineering thermoplastics cannot be dissolved in a low boiling solvent at room temperature. Additionally, high solution viscosity results in the same impregnation problems as with hot melt, as well as causing the fiber to stick together. Another problem is the difficulty in removing the solvent. Further, traces of solvent left in the towpreg lead to undesirable porosity in the composites.

An emulsion process is one way to apply powdered polymer matrix material with a very small particle size to fiber tow by synthesizing the resin as an aqueous emulsion with a surfactant. The problem with this process is that the removal of the surfactant from the final composite is difficult.

Slurry coating or wet powder processing is a non-solvent coating technique designed to resolve the problem of the insolubility of most thermoplastics in a solvent at room temperature. In slurry coating, the powder is suspended in a liquid medium, generally water, wherein no solvency exists between the resin and the medium, and the fiber bundles are drawn through the slurry. The slurry particulate matrix does not wetout the fiber, resulting in the need for higher pressures to consolidate the matrix and fibers into a composite. This towpreg can be tacky which is not suitable for weaving or braiding. Other disadvantages include the necessity for the removal of the liquid medium, volatiles, and dispersants or surfactants which are used to form the polymer/liquid colloidal state, the likelihood of aggregates in the slurry caused by poor mixing, and the possibility that polymer particles will settle during processing.

To achieve intimate mixing in emulsion or slurry coating, the particle size of the slurry or emulsion should be smaller than the fiber diameter. For many of the thermoplastics that cannot be made by emulsion or dispersion polymerization, it is extremely difficult to produce such fine powder. Thus, a coarse blend between fibers and particles is obtained. The quality of the blend decreases as the particle size increases, leading to poor matrix distribution in the consolidated composite.

In surface polymerization, coating results from the polymerization of the polymer matrix on the fiber substrate. Disadvantages associated with this process include the need to remove undesired materials, such as solvent, inhibitor or by-products of the polymerization reactions. Surface polymerization can be only conducted by special techniques, such as electropolymerization, which cannot be used to produce many of the polymeric matrices of commercial interest.

In fiber commingling, the polymeric matrix is introduced in fibrous form. Polymeric and reinforcing fibers are mingled as dry blends; however, wetting of the fiber by a process such as melting the polymer fiber is deterred until the composite is consolidated. Effective impregnation depends on the degree of randomness of the intermingling of the resin fiber throughout the system. Since no wetting of the reinforcing fibers by the matrix material occurs in this tow, higher pressures are needed to consolidate the towpreg under equivalent processing times and temperatures into a composite, as compared to completely wetted towpreg.

Film casting is one method for producing towpreg which resolves some of the problems associated with hot melt impregnation of thermoplastics. It consists of stacking a film layer of matrix material cast from either hot melt or solution over spread tow. The fibers sandwiched between two films are heated and calendered to force the resin into the fibers.

A flexible metal matrix towpreg has been produced by electroplating by American Cyanamid. Each fiber is completely wetout and uniformly coated with the metal matrix. This towpreg has desirable properties for weaving, braiding, filament winding, or for conversion to bulk or sheet molding compound feedstocks. Additionally, this towpreg does not require high pressure for consolidation. However, electroplating has a disadvantage in that systems which can be adapted to electroplating are limited. Most ceramic and polymeric matrices of commercial interest cannot be electroplated on reinforcing fibers. Since the filaments or fibers comprise one of the electrodes, the reinforcing fiber must be conductive and fibers such as glass fibers and organic fibers cannot be electroplated.

Powder coating of tow is the most recent method developed in prepreg tow technology. The significant advantages are that no solvent is required and no high stress is introduced in the process. The ultimate goal for almost all powder coating applications is the ability to deposit a thin, even thickness, high quality coating as efficiently as possible. The powder resin also must be solid at ambient and elevated storage temperatures, and be capable of melting sharply to low viscosity to permit flow and to penetrate the fiber tow when heated.

Dry powder coating has many advantages because the elimination of a wet base, solvent or water, facilitates reclamation of the coating material. This is an important economic advantage which promises a potential 100% utilization of powder plus elminination of expensive solvents that are flushed off and inevitably wasted. Thus, powder coating was conceived and has grown largely on these potential benefits.

Another method of powder coating tow with matrix is the ATOCHEM method of impregnating tow fibers with dry thermoplastic polymer powder and then covering the towpreg with a thermoplastic sheath. However, as the matrix is not melted onto the fibers, only fibers in contact with the sheath are wetted with the matrix. Consolidating this composite also requires higher pressures under comparable processing conditions than completely wetout towpreg. Furthermore, as in slurry coating, a fine polymer powder, generally less than 20 microns, is recommended for this process. Producing such fine powder from thermoplastics can be very expensive.

BRIEF SUMMARY OF THE INVENTION

Towpreg must contain sufficient matrix, typically over 25% by volume, to permit consolidation of the components into a substantially void-free composite structure without requiring the incorporation of more matrix material. Linear towpreg can be converted into two and three dimensional product forms by weaving, braiding, filament winding, and other known processes. Alternatively, towpreg can be used to create a discontinuous fiber reinforced feedstock for molding by chopping, cutting, or like known processes.

The flexible multiply towpreg according to the present invention, is Produced by a three-step process: (1) The tow of reinforcing filaments is spread laterally to expose virtually all of the fibers or filaments to the environment; (2) the matrix material is contacted with the exposed spread filaments in a manner causing interfacial adhesion; and (3) substantial cohesion between neighboring plies within a towpreg is prevented by keeping the plies laterally separated until the matrix material solidifies into a non-tacky state.

A towpreg ply is a separate section of towpreg which is free of voids and separated from neighboring plys for an average axial length of at least about 30 times the thickness of the ply. This geometric separation of non-tacky plys leads to substantially independent flexural deformation of the ply elements.

The towpreg of the present invention is suitable for weaving and braiding as it has a minimum bending radius of no greater than about 15 mm and an average ply thickness which does not exceed about 100 microns. Although the ply thickness may be limited by the above requirements to be useful in weaving and braiding, it is not necessary to constrain the size of the towpreg provided the plies comprising the towpreg can act independently.

The primary object of this invention is to provide a flexible towpreg suitable for weaving or braiding.

Another object of this invention is to provide a flexible towpreg suitable for filament winding or conversion into sheet of bulk molding compound feedstock.

A further object of this invention is the production of commercially feasible towpreg from a variety of fibers and matrices.

Yet another object of this invention is to provide flexible towpreg containing a sufficient number of filaments to be suitable for the economic production of composite structures.

An additional object of this invention is to provide towpreg with the reinforcing fibers sufficiently wetout that excessive pressure is not required to complete fiber wetout during the consolidation of the composite.

Another object of this invention is to produce towpreg rapidly in order to minimize substantial curing or resin advancement of the matrix during towpreg manufacture.

Another object of this invention is to permit production of towpreg starting with the matrix material in the form of inexpensive coarse powders which are more than twice the diameter of the fibers.

These objects and others that will become apparent to one skilled in the art are achieved by the present invention as more fully described by the drawings and the detailed description of the invention below.

DETAILED DESCRIPTION OF THE DRAWINGS

DETAILED DESCRIPTION OF THE INVENTION

Figure 5A:
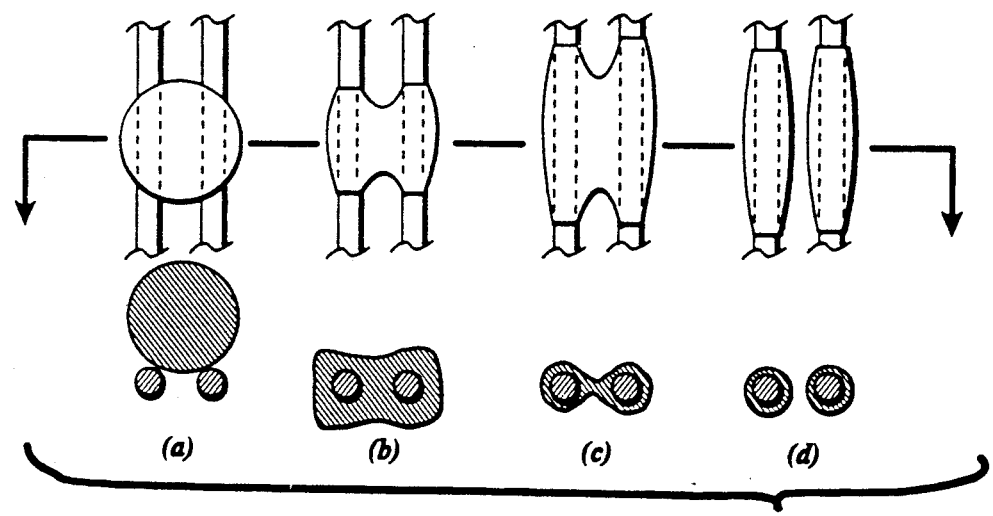
FIG. 5 is a representation of the process of melting the matrix forming material onto the reinforcing filaments of the present invention with lateral constraint (FIG. 5a) and without lateral constraint (FIG. 5b) and a section of the neck of matrix forming material between filaments (FIG. 5c)
Figure 5B:
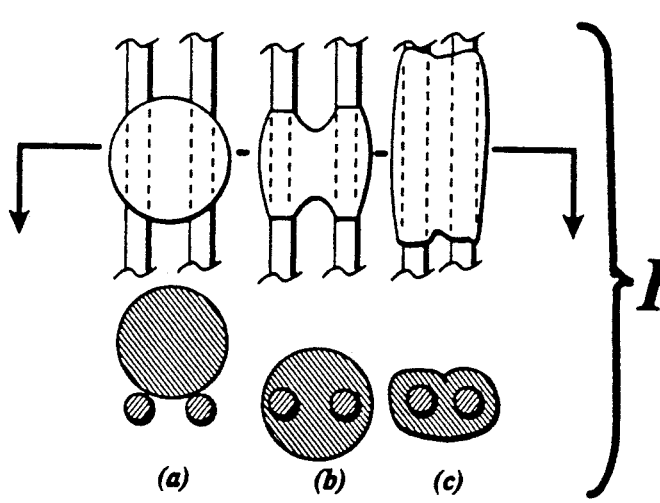

An important feature of this invention is the promotion of fiber or filament wetting or wetout while minimizing the coalescence between wetted neighboring filaments. To prevent coalescence between coated filaments it is necessary to keep the filaments separated until the matrix solidifies. One approach to keep the filaments separated is by restraining the lateral contraction of the filaments by maintaining an axial tension on the filaments. FIG. 5 illustrates the melting of a powder particle supported by two filaments. In FIG. 5a, a high axial tension constrains the filaments from approaching each other. In FIG. 5b the axial tension on the filaments is low; hence, the filaments can approach each other laterally as the particle melts and wicks along the filaments.

Figure 5C:
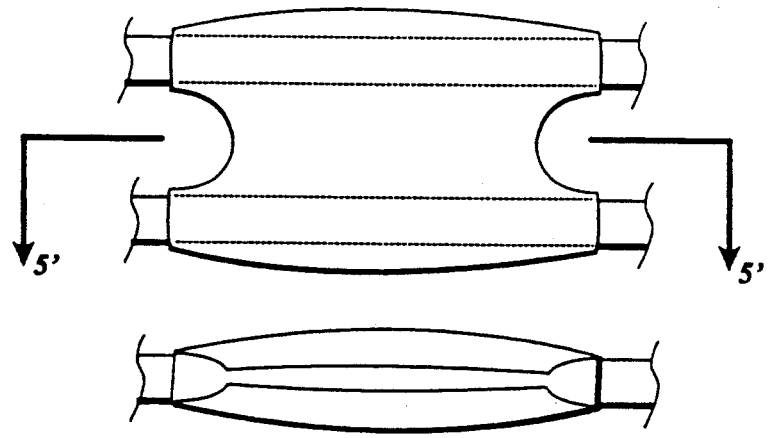

In FIG. 5b–(c) the thickness of the melt between the two filaments is large even after the filaments are substantially wetted. By comparison, in FIG. 5a–(c) the thickness of the melt between the two filaments is substantially thinner than in FIG. 5b–(c) due to constraining the lateral movement of the filaments. Consequently, it is easy to separate the two coated filaments by fracturing the thin film between the two filaments. The result of this separation process is shown in FIG. 5a–(d).

Due to constraining the filaments a tensile stress develops normal to the filament axis in the necked down melt between the filaments. This condition is illustrated in FIG. 5c. This tensile stress develops because material is drawn away from this interfilamentary area in order to spread along the filaments. The neck will fracture if this state of stress, $S_N$, exceeds the failure stress, $S_f$, for the melt.

The failure stress of the matrix can be used as a guide to determine suitable operating conditions for a particular matrix. For example, it is well known that low molecular weight molten materials have virtually negligible tensile failure stresses. It is also known that high molecular weight molten polymers lose strength as the operating temperature is increased. Similarly, partially solvated or plasticized polymers have lower tensile strength than neat polymer.

The thinness of the spread towpreg makes it possible to melt the polymer over a very short time period, and the polymer can be raised well above the normal safe temperature for the melt. In this manner, an extremely low elastic strength in the melt can be achieved to facilitate splitting the towpreg into multiple plies. Conventional matrix forming material systems may operate at a temperature at or slightly above the melting temperature of the particular matrix forming material. The coating system of the present invention can operate at a temperature significantly higher than the softening temperature of the particular matrix forming material, and generally can operate at a temperature as high as the particular matrix forming material will take without incurring degrading reaction or resin advancement during the residence time within the system. The residence times used in this invention can be short enough such that no matrix forming material degradation or resin advancement is apparent.

The same conditions which lead to lower tensile strength in a viscoelastic liquid lead to lower surface tension and viscosity for the liquid. Thus, the same conditions which promote filament separation also promote spreading of the liquid along the filaments. Thus, the conversion in liquid shape depicted in FIG. 5a can be physically realized by manipulating material and operating conditions such that the elasticity of the liquid is minimized.

By constraining or preventing lateral contraction of the filaments towards each other, the length of the neck before fracture, $L_n$, can be minimized. Then thinning of the cross-sectional area, $A_n$, is promoted and the force, $F_n$, required for fracture is reduced. Thus, maintaining a high degree of tow spreading throughout wetting and solidification promotes separate filament coating.

Fracture of the liquid film between filaments can be facilitated by additional forces. Hot gases blown normal to the plane of the spread tow will promote interfilament film fracture. Running the spread tow over grooved rolls such that the filaments are forced towards the roller axis will facilitate splitting interfilamentary films. A variety of mechanical devices can be introduced to assist filament separation like the grooved rolls.

In order to produce the towpreg of this invention, substantial wetout of the fibers by the matrix material must be accomplished such that the matrix forming material has been liquefied sufficiently to achieve adhesion to the filaments without the use of a conventional adhesive or binder. Wetout is accomplished in this example via the matrix material liquifier, such as a melter or oven, which, through heat, puts the matrix material into a liquid state. There are various liquifiers available, including any of the radiation or conduction ovens. Radiation ovens are preferred for dry powder. Additionally, a hot die can be used in place of an oven.

Since the matrix material is liquefied as part of this invention, it is possible to use any size particles of matrix material powder to coat the filaments, including coarse particles. The liquefaction of the matrix material and the wicking of the matrix material along the filaments reduces the problem of coarse blending between matrix material and filament associated with applying large diameter particles to small diameter filaments. Therefore, the particle size of the matrix forming material in this invention is not critical and can range from the diameter or thickness of the filaments or smaller, which is the generally accepted size in the art for coating, to a diameter or thickness many times larger than that of the filaments, as in the present invention. The use of large diameter or thickness particles of matrix forming material which, until the process of the present invention had not been used with any success, also results in significant cost savings.

To achieve substantial wetout, sufficient residence time in the apparatus selected to put the matrix in a liquid state and to allow the matrix material to sufficiently wetout the fiber is required. It is important that during the wetout stage the fibers or filaments are not allowed to collapse laterally. This is prevented by maintaining sufficient tension on the tow.

Figure 2:
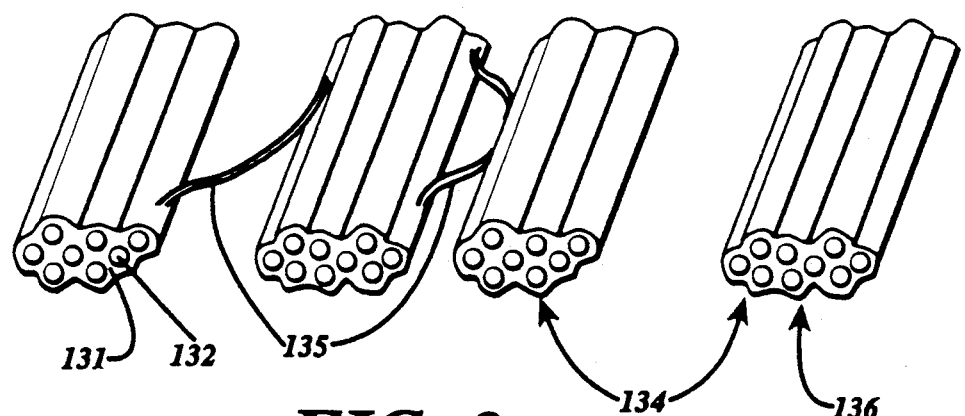
FIG. 2 is a representation of the flexible tow plies of the present invention.

After the fibers or filaments have been substantially wetout, the liquefied matrix material generally coats an entire bundle of fibers or filaments. In order to produce the towpreg of this invention, the fibers must be split from each other as shown in FIG. 2 so as to produce individually coated multiple plies within a tow. With reference to FIG. 2, the individually coated multiple plies, represented generally as 134, are composed of reinforcing filaments 132 and matrix forming material 131. Although entirely individual plies 134, such as represented generally by 136, are ideal, the plies 134 can be connected to each other by interply connectors 135, which are generally single filaments 132 coated with matrix forming material 131. These coated plies have a lower flexural rigidity than fully consolidated towpreg.

Figure 3A:
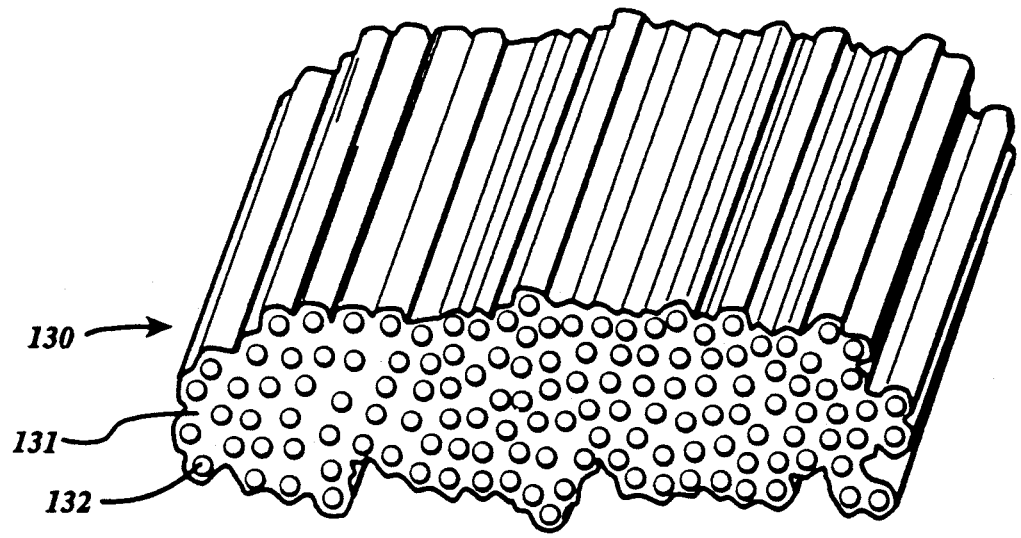
FIG. 3 is a comparison of representations of conventional towpreg (FIG. 3a) and the towpreg of the present invention (FIG. 3b)
Figure 3B:
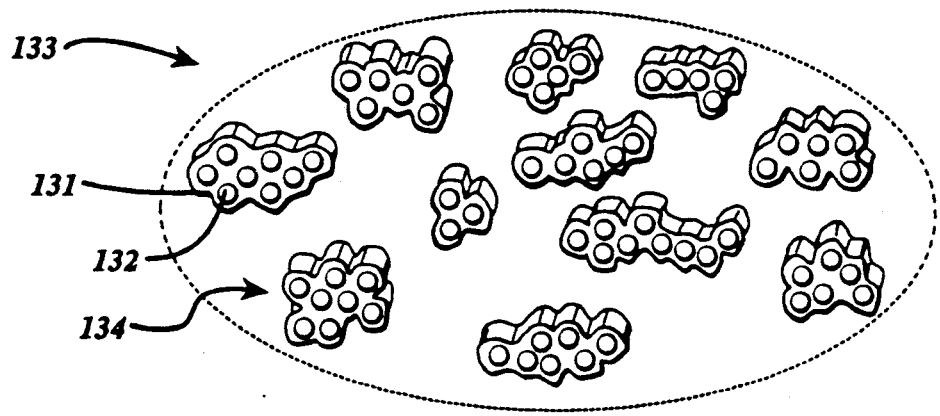
Figure 4A:
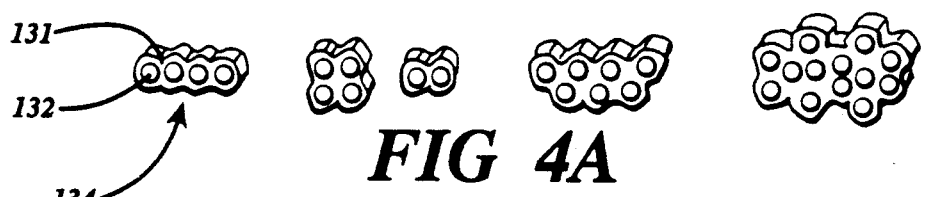
FIG. 4 is a representation of the tow plies of the present invention after solidification of the matrix forming material on the reinforcing filaments prior to gathering (FIG. 4a) and after gathering (FIG. 4b)
Figure 4B:
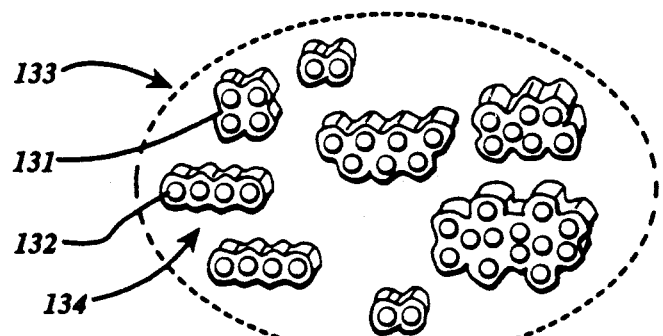
Figure 8:
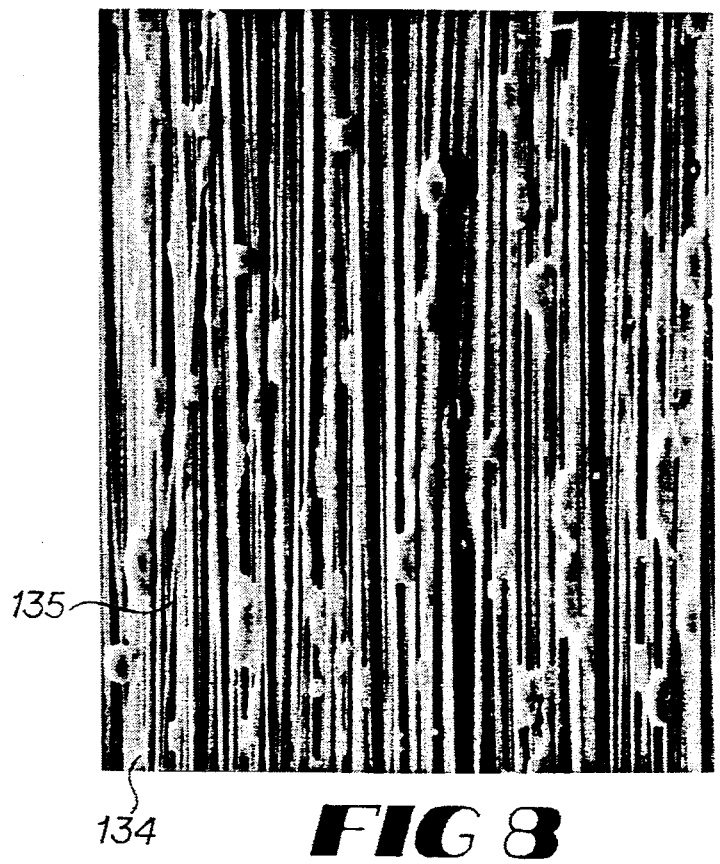
FIG. 8 is a micrograph (39.9×) of the tow plies of the present invention.
Figure 9:
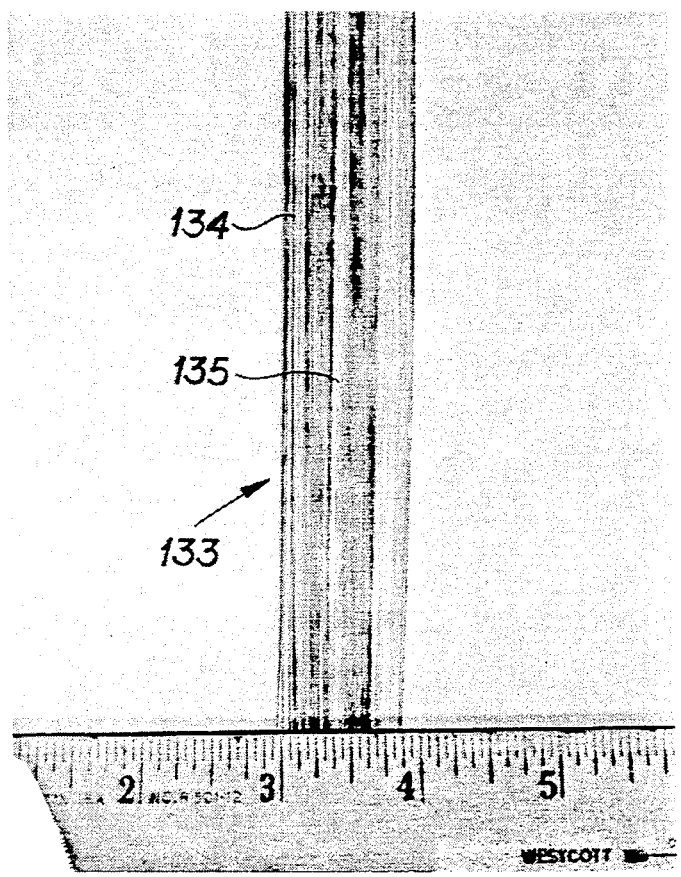
FIG. 9 is a micrograph (1×) of the towpreg of the present invention subsequent to the solidification of the matrix forming material on the reinforcing filaments but prior to the gathering of the tow plies.

With reference now to FIGS. 3 and 4, in conventional towpreg prodution, tows containing bundles of generally about 800 to 13,000 filaments 132, each filament 132 having a diameter or thickness of generally about 4 to 13 microns, are converted to towpregs 130 by coating with matrix forming material 131. The conventional process yields a towpreg "ply" 130 of about ⅛ to ¼ inch wide. The term "ply", as used in the conventional process, indicates an individual, conventional single-ply towpreg 130 which can be used alone or with other conventional single-ply towpregs 130 to form composite structures. The "plies" 134 of the present invention are individual, substantially wetout bundles of filaments 132, each bundle or "ply" having an average thickness of 100 microns or less and preferably less than 50 microns, which are gathered to form a "multiply" towpreg 133 of any desired thickness. FIG. 8 is a micrograph of a towpreg 133 of the present invention. FIG. 9 is a photograph of a towpreg 133 of the present invention. Both FIGS. 8 and 9 show the plies 134 and interply connectors 135.

Splitting occurs if the fibers or filaments are well spread by the tow spreader and are held in sufficient tension throughout the process such that the fibers or filaments cannot collapse laterally onto each other. Splitting can occur concurrently with wetout in the oven as it generally occurs as the liquified matrix material wicks longitudinally along the axis of the fiber or filament. Various alternative methods of splitting can be employed such as the addition of mechanical separators, including grooved rolls, knives, laser cutters, and convection currents perpendicular to the spread tow.

The various fibers which are useful as the tow fibers or filaments include glass fibers; carbon and graphite fibers; organic fibers, particularly liquid crystal fibers such as aramids and aromatic polyesters which are not low melting; ceramic fibers, such as silicon carbide; hybrid fibers, such as aramid/carbon, aramid/glass, aramid/carbon/glass, and carbon/glass fibers.

In general, fibers with a diameter or thickness greater that 25 microns are not useful. For example, there is no point in using a boron fiber with a diameter of 140 microns as fibers of that thickness cannot be made very flexible. Furthermore, the fiber chosen should be a reinforcing type fiber and should be available in continuous form. Suitable fibers should be thermally stable at the temperatures involved in the matrix consolidation step. Additionally, suitable fibers must have glass transition and melting temperatures greater than room temperature and melting temperatures greater than the consolidation temperature of the composite.

Both thermoplastic and thermoset polymers are suitable for use as matrix materials. Preferred polymers generally should not be sticky and should have a glass transition or melting temperature greater than room temperature while in service and after curing. Preferably, the glass transition temperature should be greater than room temperature. Therefore, elastomers, rubbers, and leathers, which are not rigid at room temperature, are unsuitable for use as the matrix material.

Example classes of polymers are the ABS group, acetals, acrylics, alkyd polyesters, allyls, aminos, epoxies, fluoroplastics, furans, melamines, nylons, phenolics, phenylene oxides and ethers, polyamides, polyamide-imides, polybutylenes, polycarbonates, polyesters, polyetheretherketones (PEEK), polyetherimides, polyethylenes, polyimides, polymethylpentenes, polyphenylene sulfides, polypropylenes, polystyrenes, polyurethanes, sulfones, ureas and vinyls. Copolymers, alloys and blends can be suitable polymer matrices.

Within these classes of polymers specific grades which are not tacky immediately following solidification after creating a multiply towpreg are preferred. In addition, thermosetting polymers should not be fully cured when the towpreg is initially solidified in order to permit bonding between the plies and tows when the composite part is finally cured.

The preferred polymers for use as the matrix material include engineering polymers, such as polyetheretherketones, polyamides, epoxies, and polyesters.

A single towpreg contains several plies which vary in thickness and width. The average thickness of the ply is less than 100 microns and is preferrably less than 50 microns. The maximum thickness of the ply is about 100 microns and the minimum height of the ply is the diameter or thickness of an unimpregnated fiber used as the reinforcing filament in the ply. Typically, the length of a ply is greater than the width of a ply and both the length and width of a ply are greater than the thickness of a ply. Generally the thickness of a ply is much less than the width of a ply, which is generally less than 2000 microns. Additionally, the average length of a ply is preferrably greater than 30 times the thickness of a ply.

ASTM D 1388 is a standard test method used to determine the stiffness of fabrics. This standard can be used to characterize the stiffness of the towpreg. Generally, a standard sample is 1 inch wide, however, measurements can be made on tows less than 1 inch wide, as long as the results are corrected for this difference. ASTM D 1388 is incorporated herein by reference.

A standard thermoplastic prepreg, such as APC 2 made by ICI, is 5 mils or 127 microns thick and has a flexural rigidity estimated to be 216,000 mg-cm. A towpreg with this flexural rigidity is very difficult to weave or braid. Thus, for weaving or braiding applications, a thinner towpreg is preferred; that is, a multiply towpreg with an average ply thickness less than about 50 microns. Such towpregs are produced by this invention.

Flexibility is important for weaving fabrics from towpreg. The cantilever test method, ASTM D 1388-64 (1975), was used to calculate the flexural rigidity by measuring the bending length of the towpreg. Bending length is a measure of the interaction between the weight of the towpreg and its stiffness as indicated by the way in which a towpreg bends under its own weight. It reflects the stiffness of the towpreg when bent in one plane under the force of gravity, and is one component of drape.

The maximum elastic strain in the towpreg is at its surface. Reinforcing fibers typically cannot withstand compressive strains beyond 0.3% without buckling. For an elastic ply this strain can be related to the ply thickness and minimum bending radius through the following expression:

$$h = 2R_{min}e$$

where:
h = the ply thickness.
$R_{min}$ = ply bending radius
e = maximum allowable surface strain.

Figure 6:
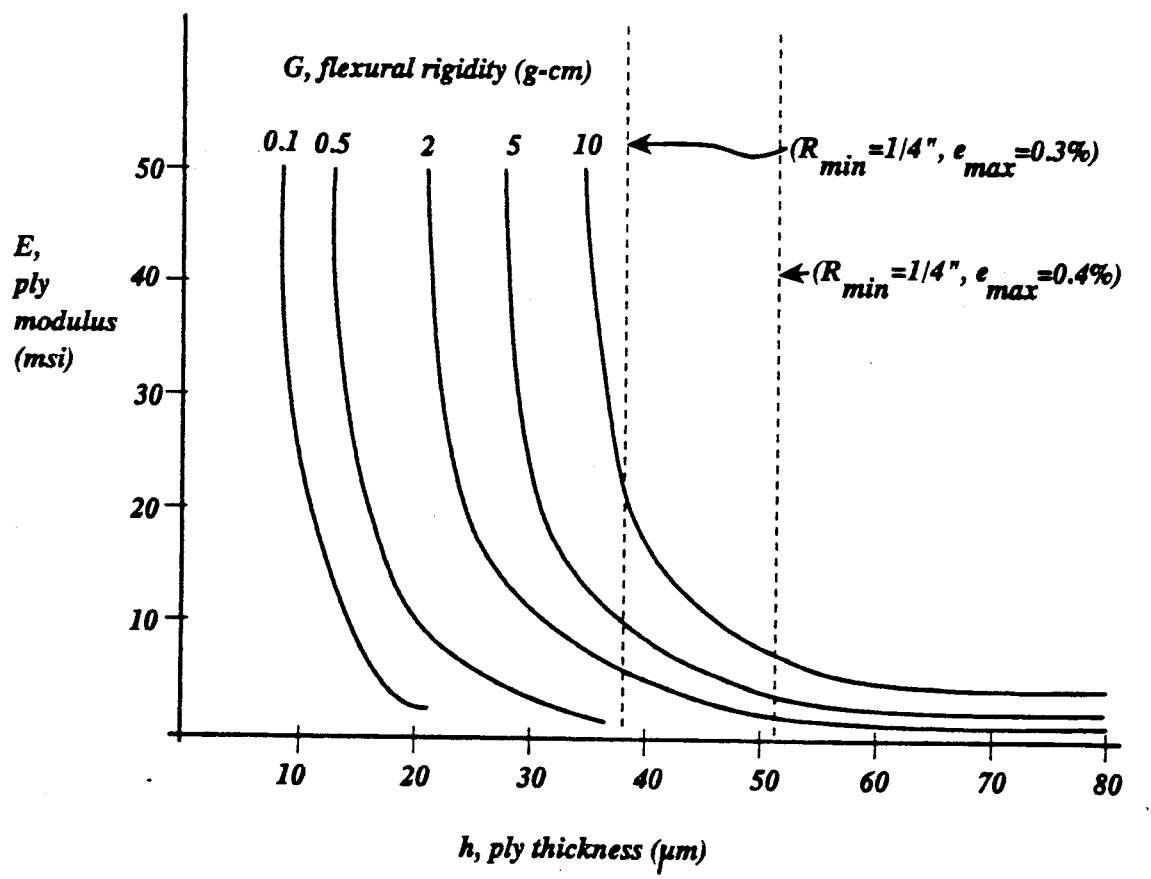
FIG. 6 is a graph of tow ply thickness versus tow ply modulus of elasticity of varying flexural rigidities for the tow plies of the present invention.

For example, a ply subjected to a minimum bending radius of 10 mm and a maximum allowable strain of 0.3% cannot be more than 60 microns thick. The minimum bending radius depends on the part geometry and the maximum strain depends on the reinforcing fiber. Thus, ply thickness depends on both the material and application. This is shown graphically in FIG. 6.

Although the towpreg of this invention is defined by its physical characteristics and, subject to these characteristics, can be composed of any combination of the tow filaments and matrix materials listed above, the following examples will help in illustrating several example towpregs of this invention.

EXAMPLE I

Carbon fiber tow filaments/PEEK matrix material

Unsized 6 K Hercules AS 4 carbon fiber tow, each carbon fiber filament having a diameter of 8 microns, passes through an air banding jet spreading the tow about 2 inches wide. Rollers before and after the spreader create tension in the tow. The tow passes over an electrostatically charged bed containing PEEK 150 PF powder from ICI with an average particle size of 90 microns. The tow is grounded and the powder is charged at about 65 kV. The tow passes in spread condition under lateral tension, to prevent collapse, through a tubular oven set at 450° C. to melt the PEEK. The tow is cooled in air and passed through drive rollers to a tension controlled winder. The residence times in the powder coater and the oven are 1.4 and 6.7 seconds, respectively. The line speed is 6.8 meters per minute, and the fiber content of the towpreg is 60% by volume. The towpreg flexural rigidity is 890 mg-cm compared to 670 mg-cm for the uncoated tow. By comparison, consolidated tape has an estimated stiffness of 216,000 mg-cm. Many of the filaments of the towpreg are readily separated. It is possible to tie a knot in the towpreg, an important feature for weaving.

EXAMPLE II

Glass tow filaments/PEEK matrix material

A towpreg comprised of Owens Corning Fiberglas high temperature sized S2 glass with 4,080 filaments, each glass filament having a diameter of 9 microns, impregnated with PEEK matrix material is produced as in Example I. After the glass filament tow passes through the air banding jet and the rollers before and after the air banding jet, the tow is wiped by a wet sponge to improve surface conductivity. Then the tow passes over the electrostatically charged bed containing the PEEK 150 PF powder from ICI with an average particle size of 90 microns. The tow is grounded and the powder charged at about 70 kV. The tow passes in spread condition under lateral tension, to prevent collapse, through the tubular oven set at 450° C. to melt the PEEK. The tow is cooled in air and passed through drive rollers to a tension controlled winder. The residence times in the powder coater and oven are 5.2 and 26.3 seconds, respectively. The line speed is 1.7 meters per minute. The fiber content of the towpreg is 60% by volume. The towpreg is split into plies similar in size and shape to the 20 strands of 204 filaments comprising the tow or roving.

Carbon Fiber Tow/LaRC-TPI Matrix Material.

A towpreg comprised of unsized 6 K Hercules AS4 carbon fiber tow, each carbon fiber filament having a diameter of 8 microns, impregnated with LaRC TPI, a thermoplastic polyimide, is produced as in Example I. After the carbon fiber filament tow passes through the air banding jet and the rollers before and after the air banding jet, the tow passes over the electrostatically charged bed containing the LaRC-TPI powder from Rogers Corp. with an average particle size of 35 microns. The tow is grounded and the powder charged at about 67 kV. The tow passes in spread condition under lateral tension, to prevent collapse, through the tubular oven set at 400° C. to melt the TPI. The tow is cooled in air then passes through drive rollers to a tension controlled winder. The residence times in the powder coater and oven are 3.2 and 16 seconds, respectively. The line speed is 2.9 meters per minute. The fiber content of the towpreg is 37% by volume. The towpreg flexural rigidity is 7,000 mg-cm compared to 670 mg-cm for the uncoated tow.

Figure 1:
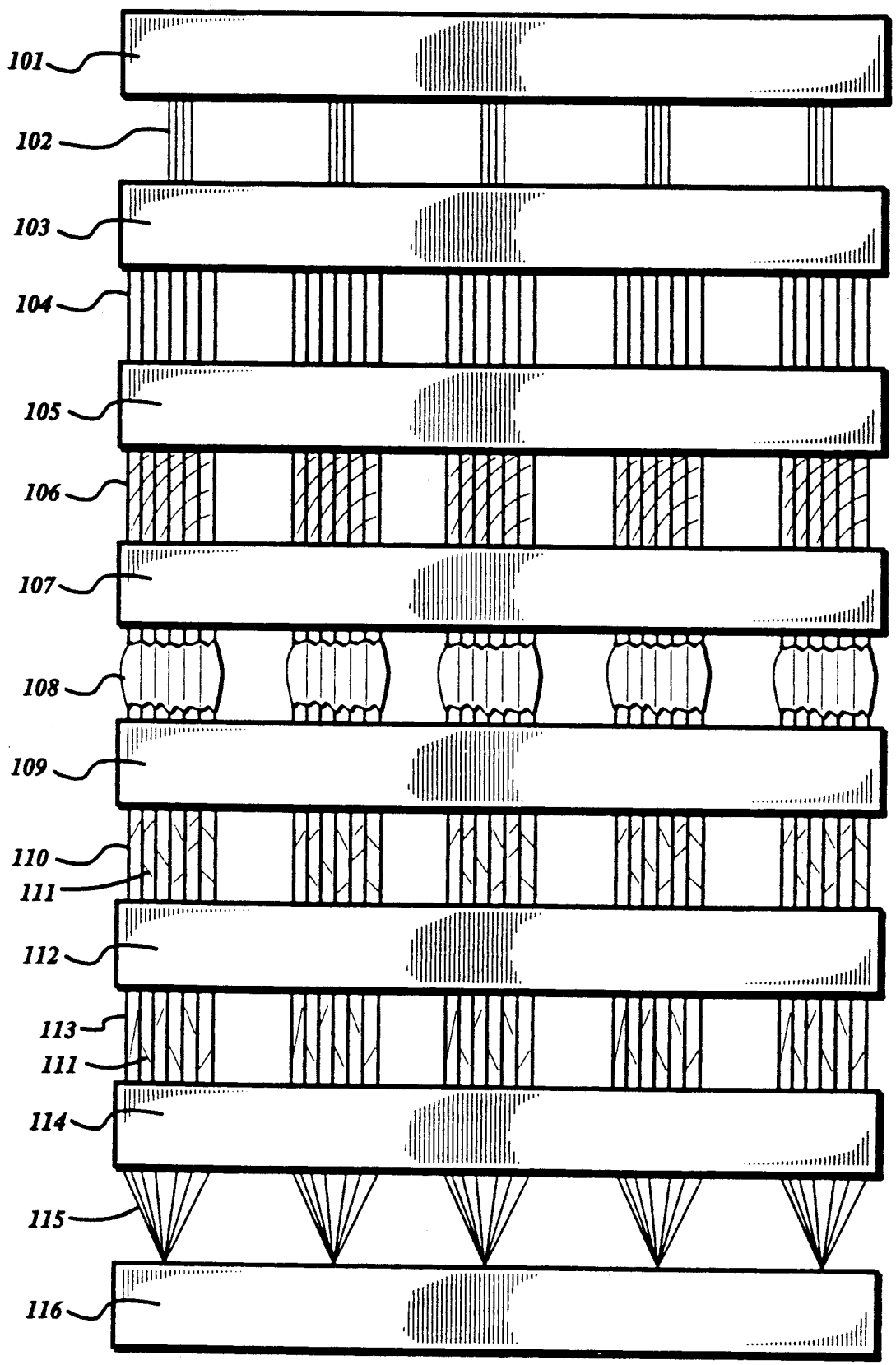
FIG. 1 is an overall flow diagram of the process of the present invention.

The method of this invention for producing the towpreg of this invention is shown in a simplified flow process chart in FIG. 1. The tow 102 is supplied during the let-off step 101, which can be bobbins or spools of tow, tow from an upstream process, or from any other tow supply. The tow 102 consists of many individual filaments 104 which are spread or separated from each other, so as to form a lateral spread of individual filaments 104, in the spreading step 103. The now spread filaments 104 are coated with matrix forming material during the coating step 105. After the filaments 104 are sufficiently coated 106 with matrix forming material, the matrix forming material is liquefied in wetout step 107, forming sufficiently wetout tow 108.

As the liquefied matrix forming material wicks down the filaments 104, the thickness of the matrix forming material becomes thinner until the thin film fractures between filaments 104 (see FIG. 5) during the splitting step 109. The now coated filaments 110, either individually or in bundles, are cooled in the cooling step 112 where the matrix forming material solidifies. During the air cooling step 112, groups of filaments 110 form individual tow plies 113. Sometimes individual filaments 110 link neighboring tow plies 113 as interply connectors 111 during the cooling step 112.

The tow plies 113 are pulled through the method by a pulling means 114 so as to keep the tow 102 moving and to place axial tension on the filaments 104 so the individual filaments 104 do not collapse upon themselves, thus forming a mass of filaments and matrix material. The tow plies 113 optionally can then be gathered together 115 to form various thickness towpregs, which are then wound in winding step 116.

Figure 7:
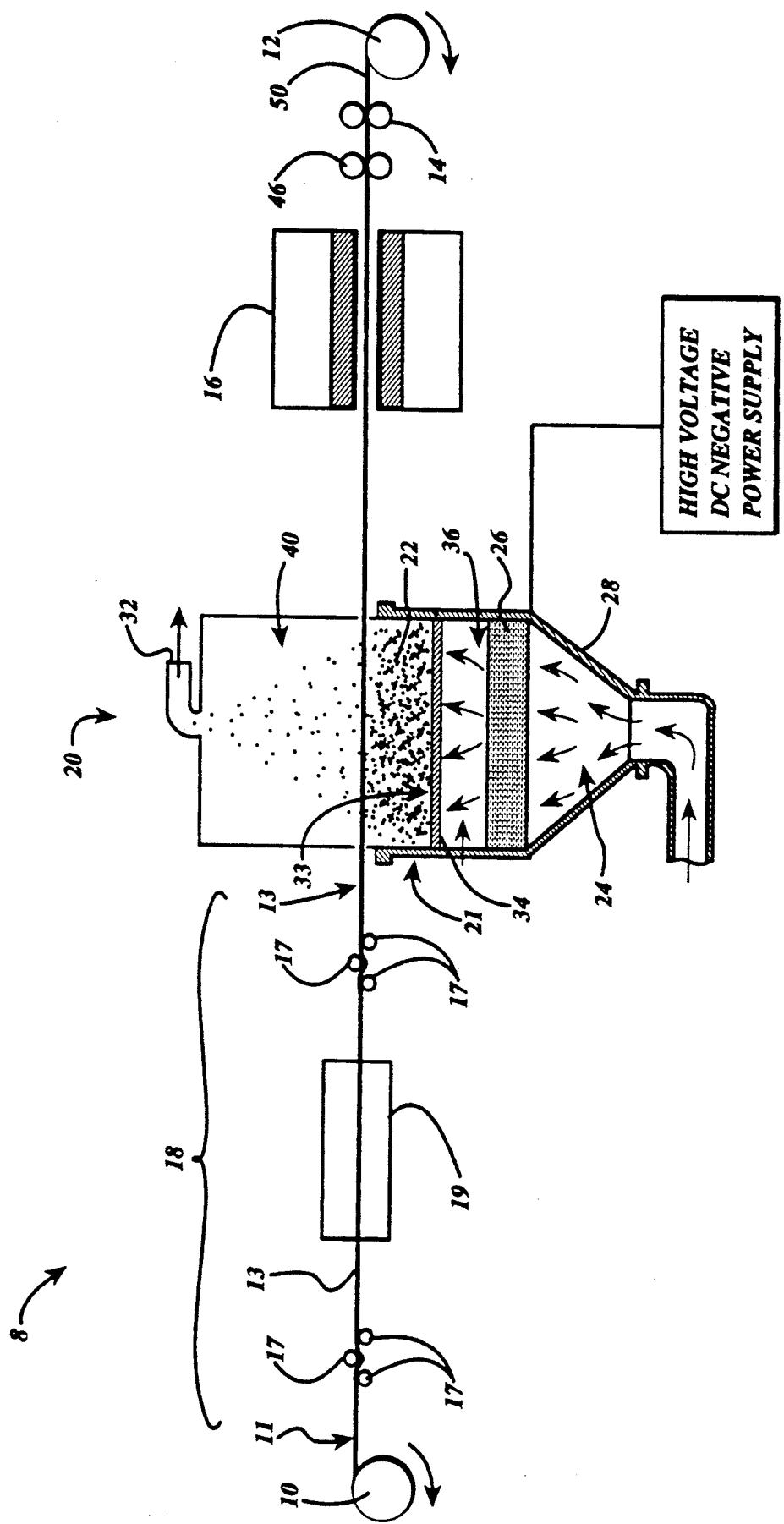
FIG. 7 is an overall schematic of the process of the present invention using Coating System Example I (electrostatic fluidized bed)

It should be noted that the above steps define the method of this invention and are not to be limited to the specific examples given throughout this specification. However, to better understand the above steps, the example below is provided with reference to the specific apparatus 8 shown in FIG. 7.

The tow 11 supplied on let-off wheel 10 is drawn through the apparatus 8 and secured to take-up wheel 12. The take-up wheel 12 is rotated at a variable speed and the let-off wheel 10 is not driven. This apparatus 8 incorporates a standard 11 ×3 inch bobbin. Intermediate pinch rollers 14 are used to pull the fibers as they come out of the oven 16. A constant tension winding on take-up wheel 12 is maintained by adjusting the winder motor (not shown) speed with a tension controller (not shown). The fiber speed through the apparatus 8 can be controlled by adjusting the speed of the pinch rollers 14. The take-up machine used in this example is a Leesona take-up machine with a pig-tail collector.

The tow let-off in this example is taken directly from bobbins of wound tow. The tow can also come directly from upstream processes. During let-off, it is important to avoid twisting the filaments 13 making up the tow 11 as twisted filaments 13 are more difficult to separate. Additionally, it is helpful to control the tension on each individual bobbin of tow to keep the line tension constant throughout the impregnating process. A tow guide plate (not shown) may be placed between the let-off mechanism and the tow spreader to aid in guiding the tow through the tow spreader.

The tow spreader 18 in this example uses a series of 6 rollers 17, although the number of rollers is not critical, and an air comb 19 to spread the fiber tow 11 to individual filaments 13. The rollers 17 are arranged in two groups of three rollers each; one group located just before the air comb 19 and one group located just after the air comb 19. The two main purposes of the rollers 17 are: (1) to provide tension to the tow thus reducing the amount of lateral collapse of the tow onto itself during the process; and (2) to reduce the vibration of the tow. The rollers 17 can be made of any material and have any surface characteristics; however, smooth Teflon rollers are preferred as they provide for good spreading of the tow. At least one of the rollers 17, preferably the one immediately before the coating system 20, must be made of a conducting material, stainless steel being preferred, so as to ground the tow 11 before it enters the coating system 20. The air comb 19 is already known in the art.

The tow 11, after leaving the let-off wheel 10, enters the first group of rollers 17 where the filaments 13 are spread. The configuration of this first group of rollers 17 allows the tow to weave through the first group of three rollers 17, passing over the first roller, under the second roller and over the third roller, helping to impart a constant tension on and to reduce the vibration of the tow filaments 13. The tow 11 then enters the air comb 19 where forced air further spreads the filaments 13. After leaving the air comb 19, the tow 11 enters the second group of rollers 17 where the filaments 13 are further spread. The configuration of this second group of rollers 17 is similar to the configuration of the first group of rollers 17 for the same reasons. As mentioned previously, it is preferred that the final roller in this second group of rollers be made of a conducting material so as to ground the tow prior to entering the coating system 20.

Various other tow spreader 18 methods are available, including smooth, grooved or crowned rollers or drums; air combs; a combination of air combs and rollers or drums; air banding jets; ultrasonic spreaders, and liquid baths. Of prime concern in choosing a tow spreading method is that the method chosen will spread the tow into a columnated tape preferably only one filament thick and that the method will not damage the tow fibers or filaments.

Additional subprocesses may be included between the tow spreader 18 and the coating bed system 20 as required in the various applications. For example, equipment for desizing, surface activation and the application of adhesion promoters may be desired to produce a towpreg desired for a specific application.

The tow filaments 13 next enter a coating system 20 where the matrix material is applied to the tow filaments 13. As the filaments enter and pass through the coating system 20, the spread of the filaments 13 is maintained. Many different coating systems 20 are useful and are discussed as examples below. An electrostatic fluidized bed system is a preferred coating system 20 and is discussed in detail in Coating System Example I. Various other coating systems 20, such as wet powder, hot melt, and solution coating are discussed previously in the prior art section and below in Coating System Examples II, III, and IV.

COATING SYSTEM EXAMPLE I

The fluidized bed coating system 20, in its simplest embodiment, comprises an enclosure 21 within which the matrix material powder 22 is confined. By a combination of air flow 24 and mechanical vibration, the powder 22 is fluidized and simultaneously electrically charged by means of high voltage electrodes 26 situated at or near the base of the container 28. The electrode 26 may be sharp points or, more usually, small diameter wires. At the top of the coater enclosure 21 there is an open port 32 to allow the escape of the fluidizing air 24.

Passing the tow 11 over and under rollers connected to a metal frame is one procedure to simultaneously ground and spread the fibers. With greater spreading, more powder can be picked up and greater flexibility of product results because the towpreg is thinner. When the fiber tow is not spread prior to coating, the towpreg emerges in a round brittle state and the fibers within the tow are not totally coated.

The powder particles 22 are uniformly dispersed in the container 28. Porous plate 34 provides for a very high resistance to travel of air 24 through the plate 34 while permitting passage of sufficient air 24 at low velocity to fluidize the powder 22. The mechanical vibration of the porous plate 34 is used to enhance fluidization and to reduce the possibility of air channeling and powder clumps. The depth of powder material 22 in the bed 33 is usually two to four inches (50 to 100 mm).

In the fluidized bed system 20, individual particles of the powder 22 adhere electrostatically to the fibers. The charged particles of powder 22 repel each other to such a degree that they rise above the chamber container 21 forming a cloud 40 of charged particles, through which the fibers are passed.

In this example, a model C30 electrostatic fluidized bed coater from Electrostatic Technology Incorporated is used. The bed dimensions are 6 ×6 inches. The electrical output is 0–90 kV and the air input is 0–12.5 standard cubic feet per minute (SCFM). The fluidized bed system 20 also incorporates an ionized air system 36 created by charging electrodes 26 below the fluidized bed 33 to prevent the unintentional ignition of the fluidized powder 22 by electrical sparking.

The fluidizing air 24 used in conjunction with this process must be dry and clean because contaminants within the air supply would result in blocking the porous plate 34 and uneven fluidization. Moisture in the air causes the powder 22 to pack on the fluidized bed 33 causing reduced fluidization efficiency. Normally dry air 24 at a pressure of 30 to 80 psi supplied at a rate of approximately 5 cu.ft./min per square foot of diffuser plate 34 is appropriate. The fluidized powder 22 is maintained in the fluidized state by controlling the air flow 24.

A typical method for drying the fluidizing air 24 is to use a cylindrical chamber (not shown) filled with silica gel, such as Drierite, which can absorb 10–14% of its weight in $H_2O$ when drying gases. Wet air enters the dryer and moves through a mesh screen into the silica gel. Moisture is separated out in the chamber. Dry air 24 then flows through the outlet to the fluidized bed 33.

The voltages employed in the fluidized bed system 20 are usually from between about 30 to about 100 kV. In most cases, negative polarity is used. The output voltage should be approximately 100 kV maximum and the maximum output energy when the system 20 is shorted to ground must not be greater than the ignition energy of the particular materials 22 being applied. The high voltage required depends on the powder being used and generally ranges from about 35 to about 90 kV. For example, polyester powders achieve a better coating when charged at 40 kV or less; epoxy powders perform well in the range from 40 to 70 kV; vinyl powders generally require a higher charge, on the order of 60 to 75 kV, and for PEEK, good powder pickup occurred at 70 to 90 kV.

A vacuum exhaust system (not shown) is positioned to collect and return the excess coating powder to the powder supply reservoir 44 (not shown). A typical exhaust system consists of one or more cyclones or bag filters (not shown), or a combination of both. Top exhaust, entrance and exit port exhaust or perimeter exhaust are all techniques that can be applied. The velocity of exhaust air should be about the same as the velocity of the inlet air flow 24. In this example, the exhaust system employs a cartridge type exhaust to recover powder by collecting the powder in a vacuum bag filter. Powder is drawn to the cartridge by air suction, and then recovered by shaking the pocket or the bag filter inside the cartridge.

The coated fiber next enters the oven 16. This should be accomplished as soon as it leaves the fluidized bed system 20 in order to melt the powder 22 onto the fibers before the decay of charge or charge relaxation occurs and the powder falls off the fibers.

The oven 16 temperature depends on the fiber and the powder 22. However, oven 16 temperature should be kept below the decomposition temperature of the powder 22 resin to avoid degradation. The coated tow can be heated by either convection or radiant heating. In this example, the oven 16 is a Lindburg single zone tube furnace. It has a maximum operating temperature of 1200° C., is 30 inches in length, and has an inside diameter of 2 inches.

COATIN SYSTEM EXAMPLE II

An alternative method of coating the tow filaments with the matrix material is a wet powder process such as slurry or emulsion coating. In wet powder coating, there is no need to ground the fiber tow prior to entering the coating system, therefore, the stainless steel roller mentioned above is not necessary. After leaving the tow spreader, the filaments are drawn through an optional primer for applying an adhesion promoter.

After leaving the primer, the filaments travel into the wet powder coating system proper which comprises a roll coater, a wet powder or emulsion reservoir, and a slurry pump. The matrix material powder is suspended in a liquid medium which can be either water or solvent based. The water based medium includes water and a water soluble binder and the solvent based medium contains a solvent and a dissolved binder. The filaments travel over the top surface of the roll coater which rotates generally in a direction complimentary to the direction of filament travel. The lower surface of the roll coater contacts the slurry or emulsion in the reservoir and becomes coated with the slurry or emulsion. As the roll coater rotates, it brings the slurry emulsion to its top surface where it contacts and coats the traveling filaments. The slurry pump maintains the slurry or emulsion in a uniform concentration.

The coated filament leaves the roll coater area and enters a drier where the water and water soluble binder or solvent are evaporated from the slurry coating the filaments. The now dry filaments leave the drier and enter a melter where the matrix material is liquified and wets the filaments.

An alternative to using a roll coater in the wet powder coating system is to draw the filaments directly through the slurry or emulsion itself. After being drawn through the slurry or emulsion, the filaments then travel directly to the drier.

COATING SYSTEM EXAMPLE III

An alternative coating system is a hot melt system comprised of a roll coater or an extruder and die. The hot melt system utilizes the roll coater, operates in the same manner as the wet powder coating system described above, with the exception that the slurry or emulsion reservoir is replaced with a melt reservoir containing the hot melt of the matrix material. As in the wet powder coating system, the roll coater is optional as the filaments can be drawn directly through the hot melt reservoir.

The hot melt coating system utilizing the extruder and die operates by pulling the spread filaments through a slit die supplied with hot melt by an extruder. The matrix material coats the tow filaments in the die. The die land is grooved to facilitate splitting the towpreg into multiple plies.

Fiber wetout starts as soon as the hot melt of the matrix forming material contacts the filaments. Therefore, an oven to accomplish further wetting may not be necessary. Special provisions, such as a grooved die or roll coater, may be necessary to facilitate splitting the towpreg into multiple plies.

COATING SYSTEM EXAMPLES IV

An alternative coating system is a solution coating system utilizing various solvents. In this system, the matrix material is dissolved in an applicable solvent and the fiber tow is drawn through this matrix material/solvent solution or over a solution coated roller so as to coat the filaments. The coated filaments are then passed through a drier to evaporate the solvent. The now dry coated filaments enter a melter where the matrix material melts and wets the tow fibers.

After the filaments 13 have been wetout by the matrix forming material in the coating system 20, the towpreg 50 can be passed through an optional set of polishing rollers 46. These rollers 46 can be located within the oven 16 or melter or just after the exit of the oven 16 or melter, but, in any event, the rollers 46 must be located in a position on the apparatus 8 where the matrix forming material is still in the liquid state. The purposes of the polishing rollers 46 are to force the still liquid matrix forming material into the tow plies to help achieve better wetout and to reduce the surface friction of the plies due to droplets of matrix forming material being left on and solidifying on the surfaces of the tow plies.

After leaving the oven or melter, the towpreg 50 cools rapidly because the plies comprising the tow are thin. During cooling, it is important that the spread tow remain in sufficient tension such that the individual plies do not collapse onto each other and result in a mass of fibers and matrix material which will result in a towpreg of high flexural rigidity. It is also important not to let the plies within the towpreg solidify in contact with each other, thus leading to a strong interply bond. An optional convective cooling method (not shown) located after the oven 16 would help keep the plies separated. Conductive cooling methods may be used since they require surface contact which constrains the lateral motion of the tow. Splitting after cooling is possible with mechanical devices such as described above; however, it is inadvisable to rely on doing all of the splitting after the cooling as this would cause too much fiber damage and loss.

The main purpose of the pinch rollers 14 is to drive the tow 11 through the process and to keep sufficient tension on the tow 11 to prevent the tow 11 from laterally collapsing onto itself. The various devices useful for the pulling include driven pinch rollers, preferrably rubber coated, and friction rollers, also preferrably rubber coated.

The take-up or wind-up device 12 can be any of the known typical tow winders with a tension control. Alternatively, the towpreg 50 may be fed directly to downstream processes such as a filament winder, a warp beam for weaving, or a chopper to produce sheet or bulk molding compound feedstock.

The above descriptions and examples have been offered for illustrative purposes only, and are not intended to limit the invention of the present application, which is as defined in the claims below.

What is claimed is:

1. An improved flexible towpreg comprising a plurality of towpreg plies, said towpreg plies comprising reinforcing filaments and matrix forming material; said reinforcing filaments being spread in a generally columnated manner and further being substantially wetout by said matrix forming material such that said towpreg plies are substantially void-free flexible composite articles, and said towpreg plies having an average thickness less than 100 microns.

2. The improved flexible towpreg as claimed in claim 1, wherein said towpreg plies have an average thickness less than 75 microns.

3. The improved flexible towpreg as claimed in claim 1, wherein said towpreg plies have an average thickness of between about 10 to 50 microns.

4. The improved flexible towpreg as claimed in claim 1, wherein said towpreg plies have an average thickness of between about 15 to 30 microns.

* * * * *